(12) United States Patent
Ginggen et al.

(10) Patent No.: US 7,868,779 B2
(45) Date of Patent: Jan. 11, 2011

(54) CIRCUITRY FOR POWERING ON AND MAINTAINING ACTIVATION OF A POWERED OFF ELECTRONIC COMPONENT

(75) Inventors: Alec Ginggen, Neuchâtel (CH); Rocco Crivelli, Bellinzona (CH)

(73) Assignee: Codman NeuroSciences Sárl, LeLocle (CH)

( * ) Notice: Subject to any disclaimer, the term of this patent is extended or adjusted under 35 U.S.C. 154(b) by 1434 days.

(21) Appl. No.: 11/098,071

(22) Filed: Apr. 4, 2005

(65) Prior Publication Data

US 2006/0220901 A1    Oct. 5, 2006

(51) Int. Cl.
G08C 19/00    (2006.01)
(52) U.S. Cl. .................. 340/825.69; 307/117; 607/27
(58) Field of Classification Search .......... 340/825, 340/572, 10.4, 825.69, 572.1, 10.1, 10.5; 607/1, 2, 4, 27; 307/117, 116, 140
See application file for complete search history.

(56) References Cited

U.S. PATENT DOCUMENTS

| | | | |
|---|---|---|---|
| 3,488,596 A | | 1/1970 | Webster et al. |
| 3,599,100 A | | 8/1971 | Ward |
| 3,651,413 A | | 3/1972 | Wycoff |
| 3,694,755 A | | 9/1972 | Ward |
| 3,769,593 A | | 10/1973 | Williams |
| 5,299,117 A | | 3/1994 | Farnbach |
| 5,342,408 A | * | 8/1994 | deCoriolis et al. ............ 607/32 |
| 5,662,694 A | | 9/1997 | Lidman et al. |
| 5,682,603 A | | 10/1997 | Sano |
| 5,694,952 A | | 12/1997 | Lidman et al. |
| 5,877,630 A | * | 3/1999 | Kraz ........................ 324/511 |
| 6,023,641 A | * | 2/2000 | Thompson ..................... 607/9 |
| 6,167,303 A | | 12/2000 | Thompson |
| 6,236,888 B1 | | 5/2001 | Thompson |
| 6,442,434 B1 | | 8/2002 | Zarinetchi et al. |
| 6,496,729 B2 | | 12/2002 | Thompson |
| 7,110,823 B2 | | 9/2006 | Whitehurst et al. |
| 7,250,695 B2 | * | 7/2007 | Connors et al. ............. 307/117 |
| 7,738,964 B2 | * | 6/2010 | Von Arx et al. ............. 607/60 |
| 2004/0046016 A1 | * | 3/2004 | Becker et al. ............... 235/380 |
| 2006/0287694 A1 | | 12/2006 | Almendinger et al. |

FOREIGN PATENT DOCUMENTS

| | | |
|---|---|---|
| EP | 0 030 135 A1 | 10/1981 |
| EP | 0 530 006 A1 | 3/1993 |
| WO | WO 96/40366 | 12/1996 |

\* cited by examiner

*Primary Examiner*—Brian A Zimmerman
*Assistant Examiner*—Nabil H Syed
(74) *Attorney, Agent, or Firm*—Cheryl F. Cohen, LLC

(57) ABSTRACT

Circuitry for automatically powering on and maintaining activation of a powered down electronic component in a first device in RF communication with a second device, wherein the first and second devices are preferably an implantable medical device and an external control device, respectively. The system including power logic circuitry for generating a power on signal to automatically close a switch and energize an otherwise powered off electronic device when the power induced in the first device by external RF energy transmitted in the RF communication signal exceeds a minimum operating threshold of the power on logic circuitry. The electronic component while powered by the power source generates a hold signal and a second power signal that is transmitted to the power on logic circuitry to sustain power to the electronic component irrespective of interruptions of relatively short duration for less than a predetermined period of time in RF communication.

21 Claims, 2 Drawing Sheets

US 7,868,779 B2

CIRCUITRY FOR POWERING ON AND MAINTAINING ACTIVATION OF A POWERED OFF ELECTRONIC COMPONENT

BACKGROUND OF THE INVENTION

1. Field of the Invention

The present invention is directed to circuitry for powering on or up of at least one powered down or off electronic component. In particular, the invention relates to a system employing at least one electronic component (e.g., processor) normally powered off but powered on in the presence of an RF communication signal. The system is designed to hold or maintain power to the component irrespective of interruption in RF communication of relatively short duration.

2. Description of Related Art

The use of a magnetically activated component such as transistors sensitive to magnetic fields, hall effect sensors, or Reed switches to non-invasively alter the characteristic, parameter, state, or program of an implantable medical device has been widely employed. In such application, an external magnet is placed proximate the magnetically activated component in the implantable medical device causing it to be programmed, altered or changed. International Publication WO9640366 is but one example of an apparatus and method for the control of an implantable device. The patented device employs a giant magnetoresistance ratio (GNR) sensor sensitive to external magnetic fields for programming the implantable medical device.

In order to conserve energy, it is desirable to power on specific electronic components, e.g., processors, only when necessary. This is particularly relevant in implantable medical devices powered by a limited power source, e.g., a battery, that requires surgery to be replaced. Those electronic components not required to be in continuous operation are normally maintained in a powered down or off state or mode. A component activated in the presence of a magnetic field may be employed to periodically power on the powered down electronic component when appropriate. The use of a magnetically activated component in medical applications, however, is circumspect. On the one hand the magnetic field must be sufficient in level to trigger the switch. On the other hand, exposure to a relatively large magnetic field may have a deleterious impact on the proper operation of the sensitive electronic circuitry of the medical device.

It is therefore desirable to solve the aforementioned problems by designing circuitry to detect the presence of an external RF communication signal and automatically power on at least one electronic component that is otherwise powered off without the use of a magnetically activated device.

SUMMARY OF THE INVENTION

An object of the present invention is to design a system for detecting the presence of an RF communication signal and automatically powering on at least one electronic component normally powered down or off without the use of a magnetically activated switch.

Another object of the invention is to develop circuitry for optimizing power consumption by maintaining power to an electronic device irrespective of interruptions in RF communication from an external device of relatively short duration.

The present invention is directed to circuitry for automatically powering on and maintaining activation of a powered down electronic component in a first device in RF communication with a second device, wherein the first and second devices are preferably an implantable medical device and an external control device, respectively. The system including power logic circuitry for generating a power on signal to automatically close a switch and energize an otherwise powered off electronic device when the power induced in the first device by external RF energy transmitted in the RF communication signal exceeds a minimum operating threshold of the power on logic circuitry. The electronic component while powered by the power source generates a hold signal and a second power signal that is transmitted to the power on logic circuitry to sustain power to the electronic component irrespective of interruptions of relatively short duration for less than a predetermined period of time in RF communication.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
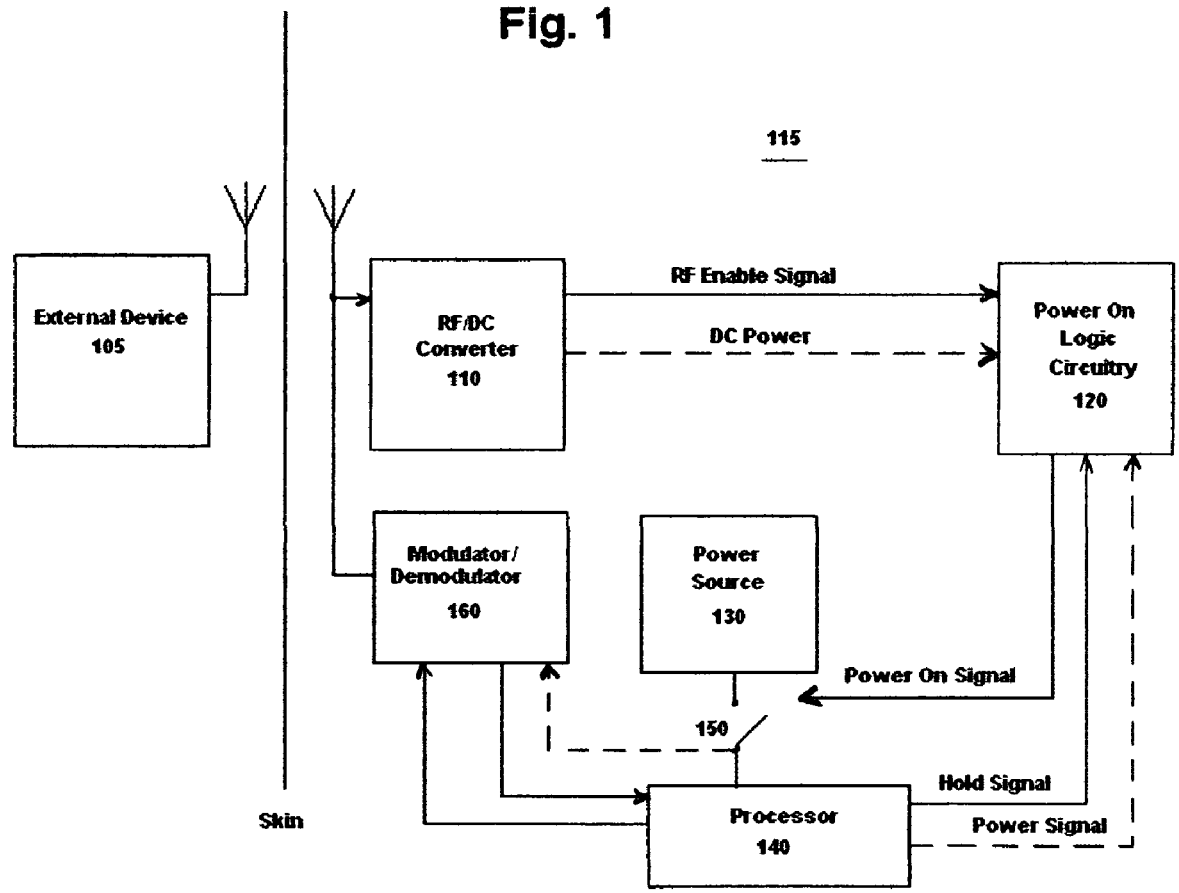
FIG. 1 is an exemplary schematic diagram of the circuitry in accordance with the present invention incorporated into an implantable medical system for automatically powering on a processor in an implantable medical device upon detecting the presence of an RF communication signal transmitted by an external device.

Circuitry for triggering and holding a power on or power enabling signal in accordance with the present invention is utilized in an electronic device or system adapted to receive an RF communication signal and in response thereto automatically energize at least one electronic component that normally remains powered off. By way of illustrative example, the device shown in FIG. 1 is a medical system including an internal device 115, e.g., an implantable medical device such as a drug infusion pump, stimulator or sensor, in telemetric communication with an external device 105, e.g., a control device, personal computer, or personal digital assistant (PDA). The invention, however, is not limited to medical application systems, but instead is suitable for any system including a first electronic device in radio communication with a second electronic device, wherein either device includes at least one component that is normally in a powered off state to conserve energy.

During communication external device 105 transmits both data and external RF energy to the implantable medical device 115. Preferably both the internal and external devices have their own associated power source. In order to conserve energy drawn from the finite internal power source, in a preferred embodiment, the external RF energy transmitted during communication from the external device 105 to the implantable medical device 115 is preferably utilized to energize one or more components in the implantable medical device, for example, an RF/DC converter 110 and power logic circuitry 120, as described further below.

In the figures a power line is represented by a dashed line while a signal line is denoted by a solid line. The exemplary implantable medical device 115 includes an RF/DC converter 110 for (i) converting the received RF communication signal to a continuous voltage and (ii) generating an RF enable signal in the presence of the external RF energy for energizing power on logic circuitry 120. To conserve power, RF/DC converter 110 generates the RF enable signal when two conditions are satisfied: (i) the external device 105 is communicating with the implantable medical device 115, i.e., in the presence of an RF communication signal; and (ii) when the power induced in the implantable medical device is sufficient to operate the power on logic circuitry 120 hereinafter referred to as a minimum operating threshold of the power on logic circuitry. Generally, the minimum operating threshold is equal to the operating voltage of the power on logic circuitry 120, e.g., approximately 1.8V. In the presence of an RF communication signal that exceeds the minimum operating threshold of the power on logic circuitry 120, RF/DC converter 110 generates an RF enable signal, preferably a digital signal, that is received by power on logic circuitry 120. For instance, the digital RF enable signal generated by the RF/DC converter 110 may be a "1" when the induced power in the implantable medical device 115 exceeds a predetermined threshold value. Otherwise, a "0" may be generated at all other times, that is, in the absence of RF communication or when the induced power in the implant falls below the minimum power operating threshold of the power on logic circuitry.

A power source 130 is connected by a switch 150 to a processor or controller 140 that normally remains powered down or off and is powered on only when needed. In response to receiving the RF enable signal from the RF/DC converter 110, the power on logic circuit 120 generates a power on signal. Switch 150 remains closed while receiving the power on signal from the power on logic circuitry 120. Thus, power is supplied by the power source 130 to the processor 140 in the presence of the RF communication signal transmitted from the external device 105. In addition, power is also supplied from the source 130 via switch 150 to a modulator/demodulator block 160. Once energized or powered on, modulator/demodulator 160 is capable of modulating responsive data signals generated by processor 140 of the implantable medical device 115 prior to transmission to the external device 105 and demodulating RF communication signals received from the external device.

The external device 105 is portable and thus its position relative to the implantable medical device 115 may vary and cause fluctuations in the level or amount of external RF energy received by the implant. During communication if the distance separation between the two devices becomes too large the level or amount of external RF energy received by the implantable medical device 115 may cause the power induced therein to fall below the minimum operating threshold of the power on logic circuitry 120. This would result in the unintentional toggling of the processor 140 between powered on and powered off states. Each time processor 140 is powered on delays, for example, hundreds of milliseconds, are experienced as a result of initialization sequencing, performance of self-checking operations, and retrieving stored programming. It is desirable to undergo such processing only once at the beginning of communication from the external device 105. To sustain power to the processor 140 irrespective of relatively short duration interruptions or fluctuations in the amount of power received by the implantable medical device, once powered on processor 140 executes programming code to generate a hold signal that is transmitted to the power on logic circuitry 120. The hold signal maintains power to the processor 140 for a predetermined period of time, irrespective of the power induced in the implantable medical device falling below the minimum operating threshold of the power on logic circuitry 120. In a preferred embodiment, the hold signal maintains power to the processor 140 for a period of approximately 15 seconds. The hold signal is cut off or terminated if after the expiration of the predetermined time period the power induced in the implantable medical device remains equal to or less than the minimum operating threshold of the power on logic circuitry 120. Accordingly, the hold signal overrides interruption or fluctuation of relatively short duration in the external RF energy received by the implant so that the processor 140 remains energized.

As described above, in order to conserve the limited energy of the power source 130, power used to energize the RF/DC converter 110 and power logic circuitry 120 is preferably drawn from the external RF energy during communication from the external device to the implantable medical device 115. If communication from the external device 105 ceases, even for a relatively short period of time, then the external RF energy used to power the RF/DC converter 110 and power logic circuitry 120 will cease as well. In the absence of energy to the power on logic circuitry 120 the power on signal will be cut off thereby defeating the underlying purpose of the hold signal, that is, to maintain the power on signal regardless of disruptions of relative short duration in the external RF energy. To overcome this problem, simultaneously with the hold signal, processor 140 supplies power to the power on logic circuitry 120. When the hold signal is cut off (at the expiration of the predetermined time period while the power induced in the implantable medical device remains equal to or less than the minimum operating threshold of the power on logic circuitry) so too is the power supplied to the power on logic circuitry 120 by processor 140. Thus, the power on logic circuitry 120 will remain energized by the processor 140 during relatively short periods of disruption in the external RF energy and power will be withdrawn simultaneously with cut off of the hold signal.

The presence of unwanted spurious RF emissions caused by noise may be mistaken as a radio signal thereby inadvertently triggering the generation of the RF enable signal and, in turn, the power on signal. To ensure that the detected external RF energy is a result of interrogation by the external device 105 rather than noise, the instructions in the programming code executed by the processor 140 during initialization include detecting the presence of transmission identification in the data stream. Program sequencing for detecting the presence of transmission identification in the data stream is preferably performed after initiation of the hold signal to prevent interruption in the identification processing as a result of glitches or fluctuations of relatively short duration on the RF enable line. If transmission identification is identified then the power on signal was properly generated in response to RF communication from the external device and the hold signal maintains power to the processor 140 during the RF communication and, at least, for the predetermined period of time, e.g., approximately 1 seconds, irrespective of interruptions or fluctuations in the power induced in the implantable medical device. Otherwise, the power on signal was improperly triggered in response to the detection of a spurious RF emission rather than an RF communication signal and the processor 140 cuts off the hold signal (e.g., after 1 second) and powers down. Alternatively, the presence of transmission identification in the data stream may be confirmed prior to powering on the processor 140, perhaps at the power on logic circuitry 220. This alternative embodiment advantageously conserves power that would otherwise be expended by the processor 140 during execution of the initialization code prior to determining that no transmission identification is present.

In operation, an RF communication signal is generated by the external device 105 and received by the implantable medical device 115. External RF energy from the received RF communication signal is then converted to a continuous DC power or voltage signal by RF/DC converter 110 and via a power line energizes power on logic circuitry 120. An RF enable signal is produced by the RF/DC converter 110 in the presence of an RF communication signal whose energy induced in the implant exceeds the minimum operating threshold of the power on logic circuitry. A power on signal is generated by power on logic circuitry 120 upon receiving the RF enable signal. Switch 150 closes when activated by the power on signal supplying power from the source or supply 130 to the processor 140. In the presence of the RF communication signal, processor 140 remains energized. The hold signal generated by the processor 140 and transmitted to the power on logic circuitry 120 sustains the power on signal and thus ensure that the processor remains energized for the predetermined period of time irrespective of the DC induced voltage falling below the minimum operating threshold. At the same time block 160 receives the RF modulated signal from the external device and outputs the demodulated data signal which is received as input to the processor 140. When a responsive data signal is generated by processor 140 in the implantable medical device 115, block 160 outputs an RF modulated signal which is then transmitted via the antenna to the external device 105. The energy necessary to power the modulator/demodulator 160 is drawn from power source 130 when switch 150 is closed in the presence of the power on signal generated by power on logic circuitry 120.

Figure 2:
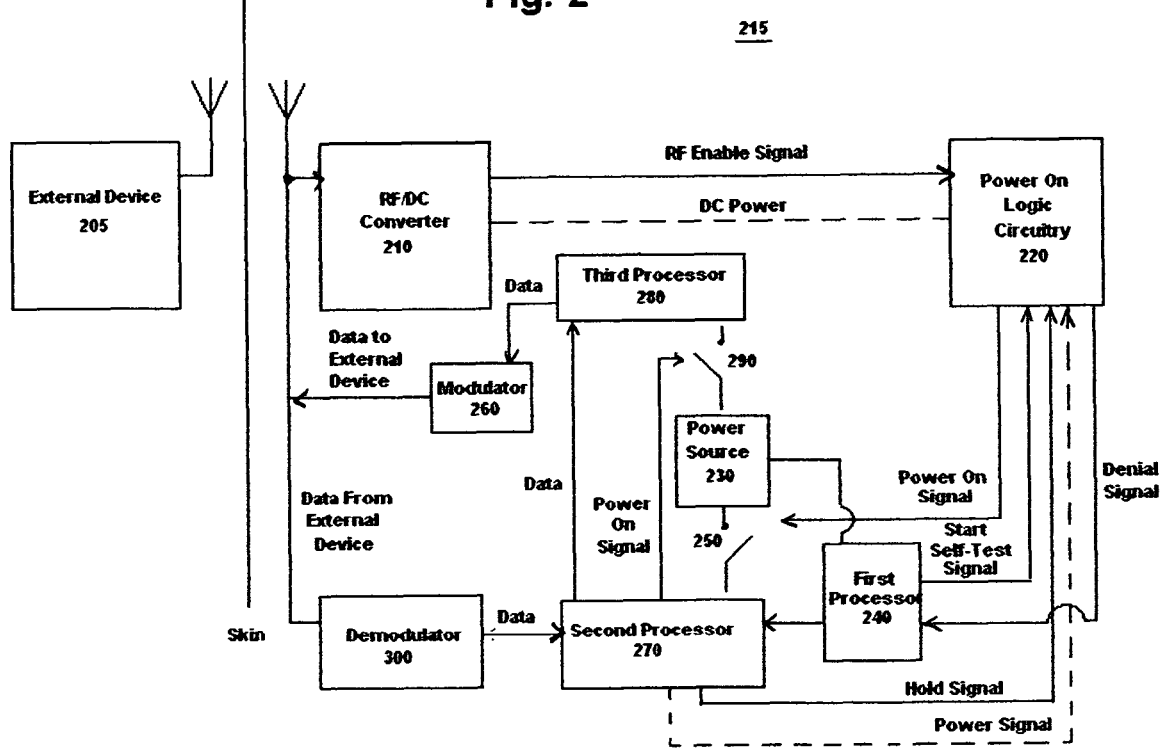
FIG. 2 is an exemplary block diagram of a second embodiment of the implantable medical system in which the circuitry in accordance with the present invention is utilized for powering on multiple processors.

FIG. 1 described above is one exemplary embodiment of the circuitry in accordance with the present invention for powering on and maintaining power supplied to a single electronic component (e.g., processor) that is otherwise in a powered off state. It is contemplated and within the intended scope of the present invention to expand application of the present inventive circuitry to devices or systems employing multiple electronic components, wherein at least two of the electronic components are normally maintained in a power off or down state. In an exemplary embodiment shown in FIG. 2, the power on and hold circuitry in accordance with the present invention is utilized in an implantable medical device 215 that employs three processors 240, 270, 280, each operating at different speeds. By utilizing multiple processors operating at different speeds power consumption is reduced. To further reduce the amount of power being consumed it is advantageous to maintain those processors that need not operate continuously in a normally powered off state until necessary to perform a particular task or function. In FIG. 2, a first processor 240 preferably operates at as low a clock speed as possible, for example, approximately 32 KHz, and remains powered on at all times to provide a real time clock signal for the system that continuously counts down 24 hour periods. The other two processors 270, 280, perform more complex tasks or functions and operate at clock frequencies higher than that of the first processor 240. By way of example, the second processor 270 may perform such complex tasks as signal conditioning for all sensors requiring a substantially higher clock frequency (e.g., 1.8 MHz) thereby consuming a greater amount of energy than that of the first processor 240. Whereas, the third processor 280 may, for example, perform shift keying modulation (e.g., amplitude, frequency or phase shift keying) at a relatively high frequency such as approximately 7 MHz. Processors 270 and 280 perform specific tasks or functionality that need not be operational at all times. Thus, in order to conserve energy, such components are normally powered off or down until required to perform a specific function.

Specifically, second and third processors 270, 280, respectively, are powered on by the power on logic circuitry 220 in the following situations: (i) in the presence of RF communication from the external device 205; and (ii) periodically during the performance of self-testing. Each situation will be addressed separately. Energizing the powered down components occurs in the presence of RF communications from the external device 205. In order to respond and provide the appropriate information requested by the external device 205 during communication with the implantable medical device 215 the second and third processors 270, 280, respectively, are energized. RF/DC converter 210 generates an RF enable signal whenever the power induced in the implantable medical device 215 exceeds the minimum operating threshold of the power on logic circuitry 220. Power on logic circuitry 220 is electrically connected to RF/DC converter 210 and produces a power on signal in response to the RF enable signal that closes switch 250 and thus energizes the second processor 270.

To ensure proper operation, the implantable medical device 215 preferably includes circuitry for automatic, periodic self-testing of some, if not all, of its components. Accordingly, in response to the lapse or expiration of a periodic period of time for initiating self-testing sequencing, first processor 240 transmits a start self-test signal to power on logic circuitry 220. In turn, power on logic circuitry 220 sends a power on signal to close switch 250 and energize the second processor 270 in preparation for initiating self-testing sequencing. In a preferred embodiment, power on logic circuitry 220 prioritizes between a received RF enable signal and a start self-test signal. If at the time of receiving a start self-test signal the power on logic circuitry 220 has already received an RF enable signal, then a denial signal is transmitted back to the first processor initiating rescheduling of the self-testing sequence.

Thus, in the preferred embodiment, either an RF enable signal or a start self-testing signal from the first processor activates the power on logic circuitry 220 to send a power on signal to energize the electronic component, i.e., the second processor 270. Yet it is to be noted that under certain circumstances it may be desirable to design the system whereby powering of the electronic component (e.g., second processor) occurs only upon the condition of both a triggering signal from the first processor 240 and the presence of an RF communication signal from the external device 205.

Energizing the second processor 270 based on the detected external RF field without any qualification or input from the first processor 240, advantageously allows the first processor, which in this embodiment always remains powered on, to execute its code without interruption or delay during the power on initialization. Another advantage is that the implantable medical device 215 is able to communicate with the external device 205 even when the first processor 240 is non-operational or malfunctioning. However, with this design configuration unwanted spurious RF emissions caused by noise is subject to being mistaken as radio signals. To overcome this problem, the second processor 270 during initialization checks for the presence of a transmission identification to verify that the detected external RF energy is a result of interrogation by the external device. Since noise will not include transmission identification, in the absence of such identification the second processor 270 will power down. As in the first embodiment, alternatively, such verification could occur before reaching the second processor 270 such as in the power on logic circuitry 220.

Once energized, the second processor 270 produces a power on signal that closes switch 290 causing power to be supplied from power source 230 to the third processor 280. Accordingly, in the presence of a radio signal from the external device 205, the second processor 270 is activated which, in turn, triggers powering on of the third processor 280. However, the second and third processors need not always both be powered on. That is, the second processor 270 may be powered on while the third processor 280 remains powered off or vice versa depending on the specific functionality or operations to be performed. There is no direct communication link between the first and third processors 240, 280, respectively. Instead, the second processor 270 after itself being powered on, in turn, sends a power on signal to close the switch 290 and energize the third processor 280. A responsive data signal output from the third processor 280 is modulated in block 260 prior to being transmitted wirelessly to the external device 205. On the other hand, an RF communication signal received at the implantable medical device 215 from the external device 205 is demodulated in block 300 and then sent to the second processor 270 for further processing.

Similar to the embodiment described in FIG. 1, in order to maintain power supplied to the second and/or third processors irrespective of interruptions or fluctuations of relatively short duration in the external RF energy, the second processor 270 during initialization generates a hold signal and a power line that is transmitted back to the power on logic circuitry 220. The hold signal and power line will be cut off (e.g., after approximately 1 second) if the interruption or fluctuation in the detected external RF energy level falls below the predetermined threshold value for longer than the predetermined period of time, e.g., approximately 15 seconds. Otherwise, the hold signal and power line will override any interruption or fluctuation of relatively short duration in the external RF energy detected by the implant so that power continues to be provided to the second and/or third processors.

During operation, the first processor 240 is preferably always powered on while the second and third processors, 270, 280, respectively, are normally powered off. In one aspect of the invention, the second and/or third processors are powered on in response to receiving a triggering signal (e.g., a real time clock signal) from the first processor 240 to conduct self-testing sequencing. Another aspect of the present invention is to power on the second and/or third processors in the presence of an external RF field emitted by the external device 205 during telemetric communication with the implantable medical device 215. The RF/DC converter 210 in the implantable medical device 215 generates an RF enable signal in the presence of the external RF field that exceeds the minimum operating threshold of the power on logic circuitry. Upon receipt of the RF enable signal, the power on logic circuitry 220, in turn, produces a power on signal that is used to close switch 250 and energize the second processor 270. The third processor 280 is activated when the switch 290 is closed in response to a power on signal generated by the second processor 270.

Thus, the power on triggering configuration in accordance with the present invention allows the first processor 240 acting as a main clock signal for the system to continue executing code without interruption or delays during execution of the initialization programming of the powered down components. Another advantage of the invention is that initialization sequencing for the second processor 270 is executed only once at the beginning of communication from the external device 205 irrespective of fluctuations or disruptions of relatively short duration in the external RF emissions.

In the second exemplary embodiment the electronic device is an implantable medical device employing three processors one of which is continuously powered on while the remaining two processors are normally powered down or off. It is, however, contemplated and within the intended scope of the present invention to incorporate the powering on and hold features of the present invention to any system or device capable of receiving RF communications and employing any number of electronic components in which at least one of the components is normally powered down or off. Moreover any number of one or more powered off electronic components may be connected in a chain whereby the previous component generates a signal for triggering the supply of power to the next component. The powering and hold circuitry in accordance with the present invention may be broadly applied to any device or system adapted to receive RF communications and in the presence thereof to automatically power up at least one electronic component that is otherwise normally powered down.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A system comprising:
   a first device adapted to receive an RF communication signal, the first device comprising:
   a converter for converting the received RF communication signal to a continuous voltage;
   power on logic circuitry electrically connected to the converter, the converter generating an RF enable signal when power induced in the first device by external RF energy transmitted in the received RF communication signal exceeds a minimum operating threshold of the power on logic circuitry, the power on logic circuitry producing a first power on signal in response to receiving the RF enable signal;
   a power source; and
   an electronic component that remains in a powered off state is electrically connected to the power source via a switch that is opened and remains closed in the presence of the first power on signal from the power on logic circuitry.

2. The system in accordance with claim 1, wherein the electronic component remains powered on irrespective of interruptions for a duration less than a predetermined period of time in the amount of power received by the first device by maintaining for the predetermined period of time a hold signal and a second power signal both signals generated by the electronic component and transmitted to the power on logic circuitry.

3. The system in accordance with claim 2, wherein the electronic component once powered on by the power source generates the hold signal and the second power signal upon detecting a transmission identification in the RF communication signal to verify that the detected external RF energy is a result of interrogation by the external device.

4. The system in accordance with claim 1, wherein the first device is an implantable medical device and the second device is an external control device.

5. The system in accordance with claim 1, wherein the electronic component is a processor.

6. A system comprising:
a first device adapted to receive from a second device an RE communication signal, the first device comprising:
a converter for converting the received RF communication signal to a continuous voltage;
power on logic circuitry electrically connected to the converter, the converter generating an RF enable signal when power induced in the first device by external RF energy transmitted in the received RF communication signal exceeds a minimum operating threshold of the power on logic circuitry, the power on logic circuitry producing a first power on signal in response to receiving the RF enable signal;
a power source;
a first electronic component that is continuously powered on by the power source and operates at a first clock speed; and
a second electronic component that remains in a powered off state is electrically connected to the power source via a first switch that is opened and remains closed in the presence of the first power on signal from the power on logic circuitry, the second electronic component operates at a second clock, speed greater than the first clock speed of the first electronic component.

7. The system in accordance with claim 6, wherein the first electronic component is a first processor providing a real time clock signal that continuously counts down 24 hours.

8. The system in accordance with claim 6, wherein the second electronic component remains powered on irrespective of interruptions for a duration less than a predetermined period of time in the amount of power received by the first device by maintaining for the predetermined period of time the bold signal and the second power signal both signals generated by the electronic component and transmitted to the power on logic circuitry.

9. The system in accordance with claim 8, wherein the second electronic component once powered on by the power source generates the hold signal and the second power signal upon detecting a transmission identification in the RF communication signal to verify that the detected external RF energy is a result of interrogation by the external device.

10. The system in accordance with claim 6, further comprising a third electronic component that remains in a powered off state is electrically connected to the power source via a second switch that is opened and remains closed in the presence of a third power on signal from the second processor after being powered on, the third electronic component operates at a third clock speed greater than the first clock speed of the first electronic component.

11. The system in accordance with claim 6, wherein the first device is an implantable medical device and the second device is an external control device.

12. The system in accordance with claim 10, wherein the first, second and third electronic components are all processors.

13. A system comprising:
a first device adapted to receive from a second device an RF communication signal, the first device comprising:
a power source;
a first electronic component that is continuously powered on by the power source and operates at a first clock speed;
a converter for converting the received RF communication signal to a continuous voltage;
power on logic circuitry electrically connected to the converter, the converter generating an RF enable signal when (i) power induced in the first device by external RF energy transmitted in the received RF communication signal exceeds a minimum operating threshold of the power on logic circuitry or (ii) the power on logic circuitry receives a start self-test signal from the first electronic component upon the expiration of a periodic period of time for initiating self-testing sequencing to ensure proper operation of at least one component of the first device; the power on logic circuitry producing a first power on signal in response to receiving the RF enable signal; and
a second electronic component that remains in a powered off state is electrically connected to the power source via a switch that is opened and remains closed in the presence of the first power on signal from the power on logic circuitry, the second electronic component operates at a second clock speed greater than the first clock speed of the first electronic component.

14. The system in accordance with claim 13, wherein the second electronic component remains powered on irrespective of interruptions for a duration less than a predetermined period of time in the amount of power received by the first device by maintaining for the predetermined period of time the bold signal and the second power signal both signal generated by the electronic component and transmitted to the power on logic circuitry.

15. The system in accordance with claim 14, wherein the power on logic circuitry generates a denial signal that is transmitted to the first electronic component in response to receiving the start self-test signal when the hold signal is already being received, the denial signal delaying the initiation of self-testing of the at least one component of the first device.

16. A method for automatically powering on and maintaining activation of a powered off electronic component of a first device that receives an RF communication signal from a second device, the first device including power on logic circuitry electrically connected between a converter and the electronic component, the method comprising the steps of:
receiving at the first device the RF communication signal transmitted from the second device;
converting the received RF communication signal to a continuous voltage;
generating using the converter an RF enable signal when power induced in the first device by external RF energy transmitted in the received RF communication signal exceeds a minimum operating threshold of the power on logic circuitry;
producing at the power on logic circuitry a first power on signal in response to the RF enable signal; and
in response to receiving the first power on signal from the power on logic circuitry, closing a switch disposed between a power source and the electronic component to power on the electronic component.

17. The method in accordance with claim 16, further comprising transmitting a hold signal and a second power signal from the electronic component to the power on logic circuitry for a predetermined period of time so as to maintain power to the electronic component irrespective of interruptions for a duration less than the predetermined period of time in the amount of power received by the first device.

18. The method in accordance with claim 17, wherein prior to the transmitting step, confirming the presence of a transmission identification in the RF communication signal to verify that the detected external RF energy is a result of interrogation by the external device.

19. A method for use in a first device that receives an RF communication signal from a second device, the first device having at least two electronic components including a continuously powered on first electronic component operating at a first clock speed and a . powered off second electronic component operating at a second clock speed greater than the first clock speed of the first electronic component, power on logic circuitry electrically connected between a converter and the first electronic component, the method comprising the steps of:

receiving at the first device the RF communication signal transmitted from the second device;

converting the RF communication signal to a continuous voltage;

generating an RF enable signal when power induced in the first device by external RF energy transmitted in the received RF communication signal exceeds a minimum operating threshold of the power on logic circuitry;

producing at the power on logic circuitry a first power on signal in response to the RF enable signal;

in response to receiving the first power on signal from the power on logic circuitry, closing a first switch disposed between a power source and the second electronic component to power on the second electronic component.

20. The method in accordance with claim 19, further comprising transmitting a hold signal and a second power signal from the second electronic component to the power on logic circuitry for a predetermined period of time so as to maintain power to the electronic component irrespective of interruptions for a duration less than the predetermined period of time in the amount of power received by the first device.

21. The method in accordance with claim 20, further comprising the steps of:

producing at the second electronic component a third power on signal in response to the first power on signal; and in response to receiving the third power on signal from the second electronic component, closing a second switch disposed between the power source and a powered off third electronic component to power on the third electronic component, the third electronic component operates at a third clock speed greater than the first clock speed of the first electronic component.

* * * * *